Figure 1:
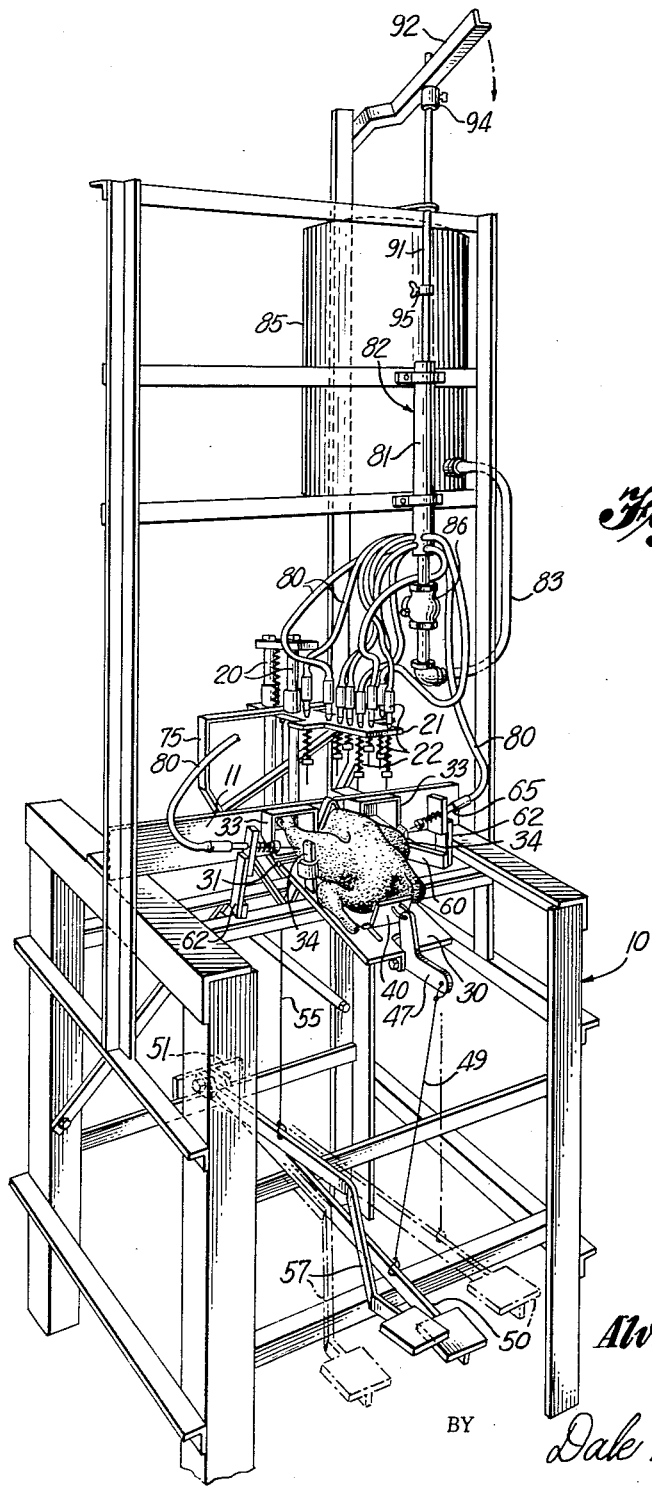

May 22, 1962  A. I. NELSON  3,035,508
APPARATUS FOR TREATING MEATS SUCH AS POULTRY
Filed Jan. 16, 1961  5 Sheets-Sheet 1

INVENTOR
*Alvin I. Nelson*

BY
*Dale H. Hoscheit*
ATTORNEY

May 22, 1962 A. I. NELSON 3,035,508
APPARATUS FOR TREATING MEATS SUCH AS POULTRY
Filed Jan. 16, 1961 5 Sheets-Sheet 2
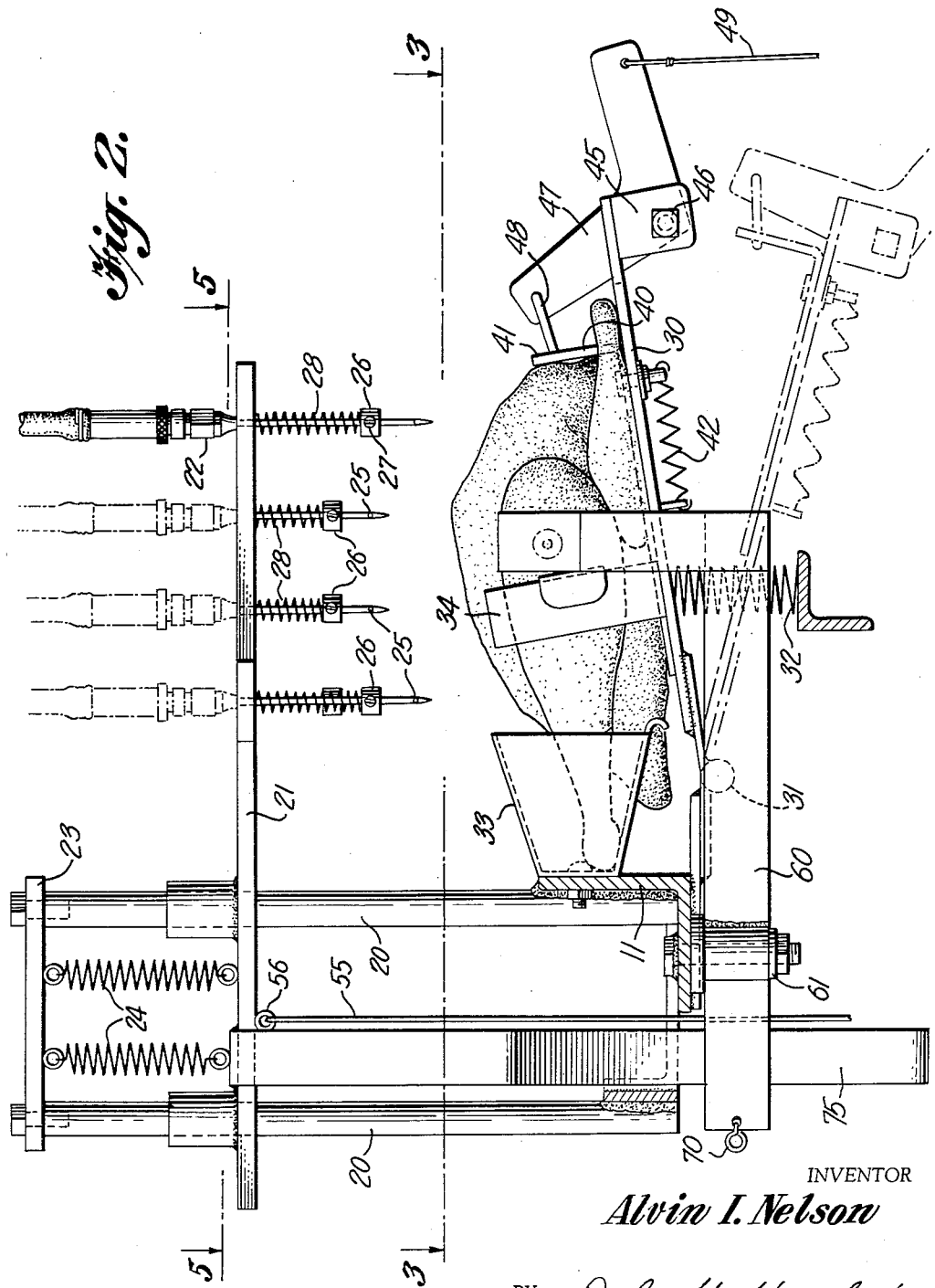
INVENTOR
*Alvin I. Nelson*
BY *Dale H. Hoscheit*
ATTORNEY

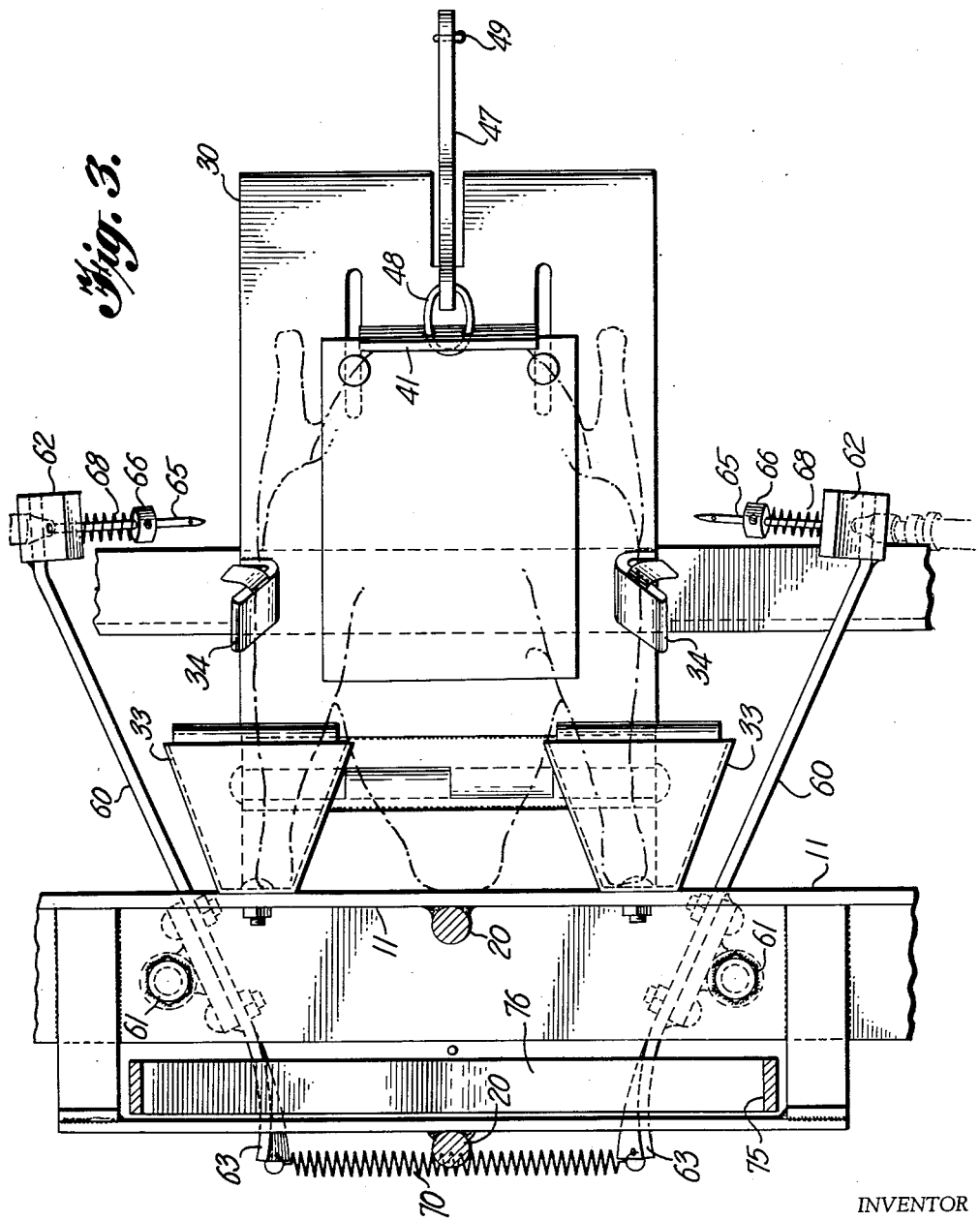

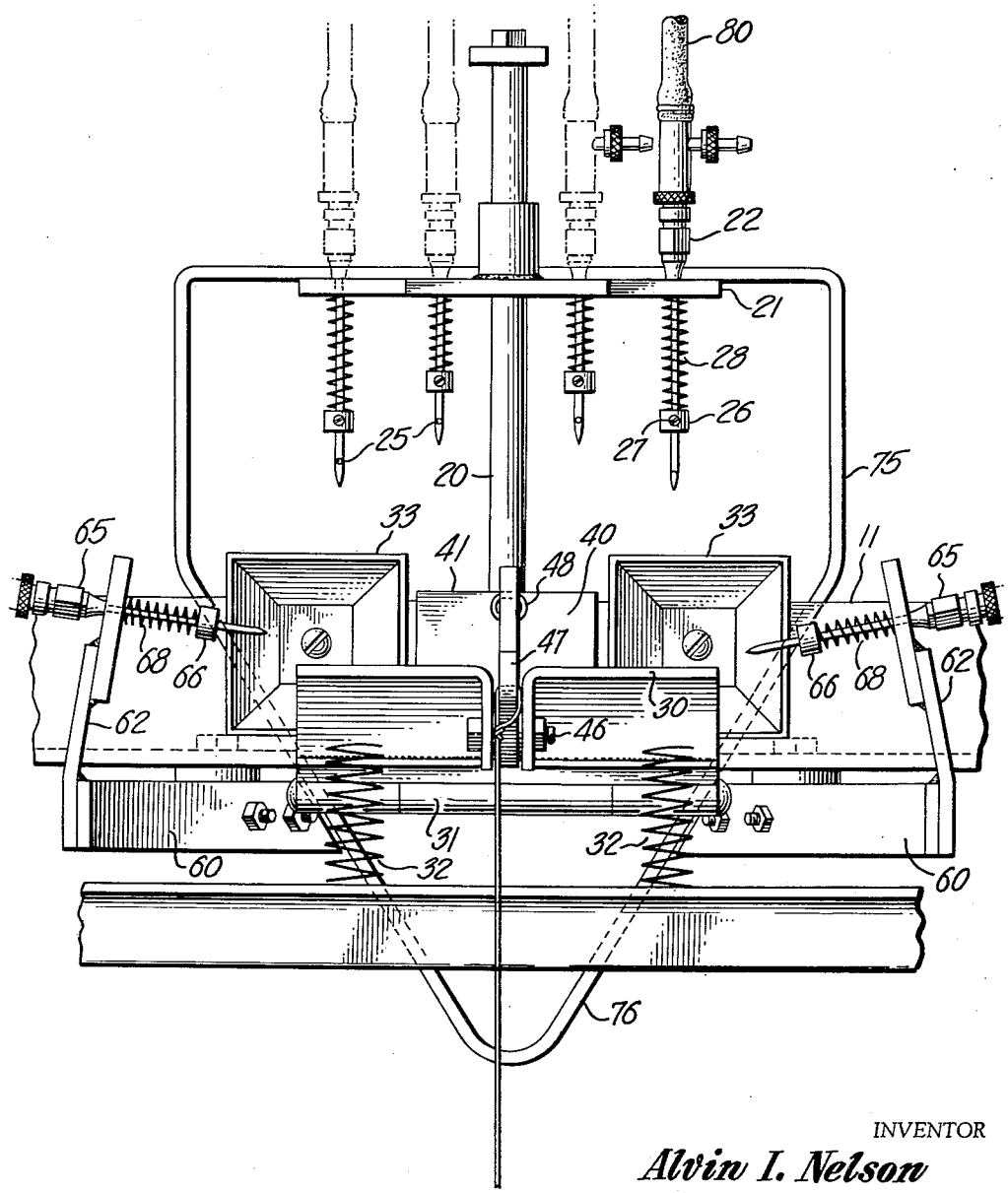

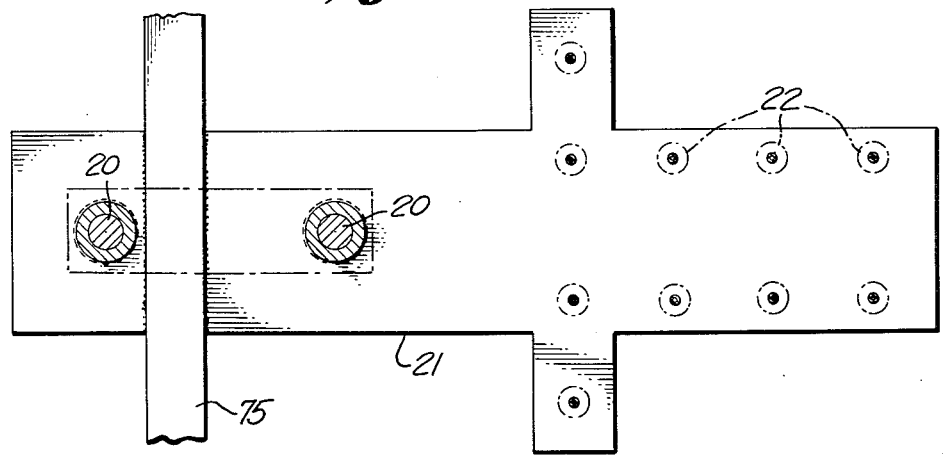
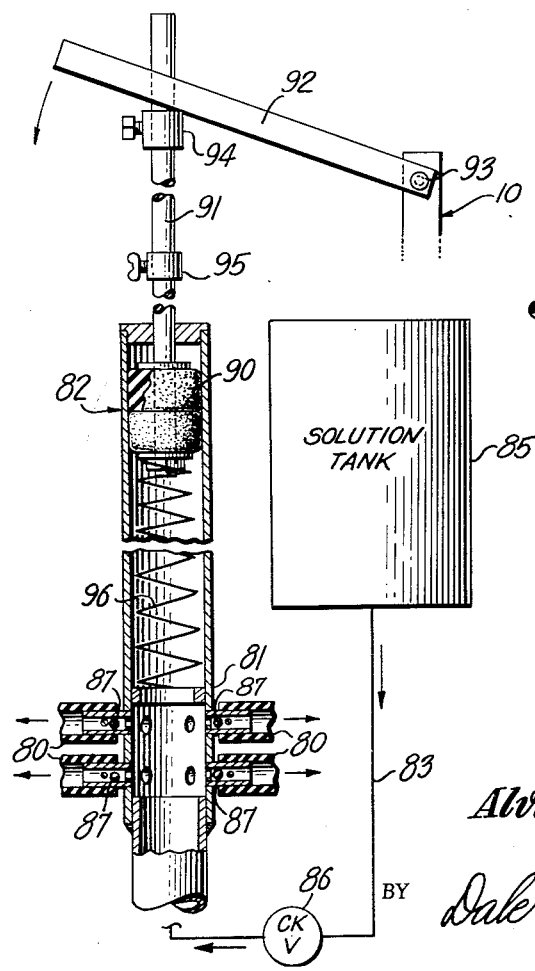

United States Patent Office 3,035,508
Patented May 22, 1962

3,035,508
APPARATUS FOR TREATING MEATS
SUCH AS POULTRY
Alvin I. Nelson, Champaign, Ill., assignor to International Minerals & Chemical Corporation, a corporation of New York
Filed Jan. 16, 1961, Ser. No. 83,038
15 Claims. (Cl. 99—257)

This invention relates generally to apparatus for treating a body of meat such as may be desired to enhance the flavor of the meat. More specifically, the invention is directed to injecting liquid such as a solution of monosodium glutamate and gelatin into a poultry carcass, such solution being injected to enhance the flavor of the poultry.

In the processing of various meat products there have been developed various machines by use of which a liquid seasoning, pickling of curing solution is injected into a body of meat. For example, in the treating of ham and bacon such machines are employed for injecting the pickling or curing solution into the meat, thus removing the necessity for prolonged submerging of the meat in the pickling or curing solution prior to introducing the meat into the smokehouse.

Injecting treating liquid such as a solution of monosodium glutamate and gelatin into a poultry carcass is effective in enhancing the flavor of the poultry. Aside from the irregularities in the shape of a poultry carcass, the distribution of the meat on the carcass presents special problems in attempting to obtain reasonable uniformity in distributing the injected treating liquid within the meat on the carcass where the injection is carried out by machine. The machines heretofore available for injecting treating liquid into a body of meat are not suitable for irregularly shaped bodies of meat in that reasonably uniform distribution of the injected liquid cannot be obtained by using such prior available machines. Also such machines are not capable of handling poultry carcasses with the distribution of the meat as is characteristic of such carcasses.

In consideration of the above-noted problems, the instant invention has as its principal object the providing of an improved apparatus enabling quick and easy injection of treating liquid into an irregularly shaped body of meat while achieving relatively even distribution of the treating liquid as injected into the meat.

A further object of the invention is to provide apparatus wherein an irregularly shaped body of meat may be treated with a liquid such as desired to enhance the meat flavor with the liquid being injected into the sides and top or bottom to obtain more complete and even treatment of the body of meat.

A further object of the invention is to provide apparatus for injecting treating liquid into an eviscerated poultry carcass with the apparatus constructed to receive and hold successive carcasses to be treated in a uniform rigid position for relatively even distribution of treating liquid within the meat distributed on the carcass.

A further object of the invention is to provide an apparatus for injecting treating liquid into an eviscerated poultry carcass in which the carcass is retained in a rigid position and the liquid injected into the legs, thighs, base of the wings and at spaced positions on each side of the breast for essentially uniform distribution in or application of the treating liquid into the meat on the carcass.

The above and other objects and novel features of the instant invention will be apparent from the following description taken in conjunction with the accompanying drawings. It is to be expressly understood, however, that the drawings are for the purpose of illustration only and are not intended to define the limits of the invention, but rather to merely illustrate a preferred embodiment and structure incorporating the features of the instant invention.

In the drawings wherein like reference characters refer to like parts throughout the several views:
FIGURE 1 is a perspective view showing the apparatus of the instant invention with a poultry carcass being loaded thereon.
FIGURE 2 is a view in side elevation showing the positioning of a poultry carcass for liquid treating.
FIGURE 3 is an elevational view taken on line 3—3 of FIGURE 2.
FIGURE 4 is a front elevational view of the structure shown in FIGURE 2 with the poultry carcass omitted.
FIGURE 5 is a view taken on line 5—5 of FIGURE 2 showing the relationship of the liquid injecting needles carried on the vertically reciprocal head of the apparatus.
FIGURE 6 is a schematic view with parts in section illustrating the pump for supplying liquid to the injecting needles.

Referring to the drawings and more particularly to FIGURE 1, the apparatus is shown thereon as including a main frame 10 providing support for the various parts and elements forming the apparatus for use in treating the poultry carcass. The frame 10 has a cross-member 11 from which many of the operating parts and elements of the apparatus are supported as will be described.

A pair of upstanding guide posts 20 are secured on member 11 with a head 21 slidably mounted on these posts. Head 21 carries a plurality of liquid injecting needles 22 disposed in the relationship shown in the plan view of the head in FIGURE 5.

A crossbar 23 is mounted between the upper ends of posts 20 and springs 24 connected between the crossbar and head 21 to normally urge the head upwardly to a retracted position. The liquid injecting needles 22 are slidably mounted in spaced apertures formed in head 21, the spacing of such apertures being illustrated more clearly in FIGURE 5. Each needle is hollow and terminates in a diagonally cut pointed end to facilitate entry of the needle into the body of meat. In order that the needle end will not be clogged in use, the lower end is closed and a port 25 formed in the side of the needle and through which liquid is introduced into the meat when the needle is inserted.

Each needle carries a stop collar 26 which is adjustable longitudinally of the needle and settable in a desired position on the needle by a set screw 27. The position of collar 26 on the individual needle determines the maximum depth to which the needle is insertable in the body of meat in operation of the apparatus. The adjustability of the collar is advantageous in that each of the needles may be set for the proper degree of insertion dependent upon the particular area of the body of meat in which the needle is to inject the liquid. A spring 28 is disposed between the collar 26 and the underside of head 21 on each needle. This spring urges the needle downwardly to the normal position as shown in FIGURE 2 while providing a resiliently yieldable connection so that as the head 21 is lowered and the needles 22 inserted into the body of meat to the limit of the collars 26 any further downward movement of the head 21 will be taken up by the head sliding down on the needles and compressing the springs 28 between the collars 26 and head 21.

A platform 30 providing a support surface for the body of meat to be treated, such as a poultry carcass, is hingedly mounted at 31, on cross-member 11 to connect the rear end of platform 30 with frame 10. The platform 30 is swingable from a downwardly inclined loading position as shown in FIGURE 1 and shown in phantom on FIGURE 2 to a meat treating position as shown in solid lines on FIGURE 2. The platform is biased to the meat treating position by a pair of springs 32 disposed beneath the platform as shown more clearly in FIGURES 2 and 4.

Several positioning elements for the body of meat to be treated are provided mounted on the platform 30 and adjacent the rear end of the platform to cooperate with the body of meat to be treated, the illustrated embodiment being specifically adapted for a poultry carcass. These positioning elements are disposed to insure proper and rigid support of the body of meat on the platform in position for injecting the treating liquid. Thus, a pair of pockets 33 are mounted on cross-member 11 adjacent the rear end platform 30 in proper position to receive the ends of the legs of a poultry carcass. Also there are provided on opposite sides of the support surface of platform 30 a pair of positioning elements in the form of guides 34. The guides 34 are spaced so that in sliding a poultry carcass into position on platform 30 the guides will be disposed outside the opposite legs of the carcass to center the carcass longitudinally of the support surface of the platform.

A clamp 40 is slidably mounted adjacent the forward end of platform 30. Clamp 40 provides an upstanding portion 41 to engage against the end of the carcass under the urging of a spring 42 connected between the clamp and the underside of platform 30 (FIGURE 2) and thereby force the carcass rearwardly on platform 30 so that the ends of the legs move back into the positioning pockets 33.

The forward end of platform 30 is slotted and downwardly extending tabs 45 provided adjacent the slot to pivotally mount at 46 a bell crank 47. One end the crank is connected by link 48 to the upstanding portion 41 of clamp 40. The other end of crank 47 is connected by a suitable cable 49 to a foot engageable treadle 50 which is hingedly connected at 51 to the rear lower base portion of frame 10.

The operation of the clamp 40 to move it to open position for receiving the body of meat and for drawing the platform 30 downwardly to its loading position is carried out by engaging treadle 50 and pushing it down whereby cable 49 acting through bell crank 47 draws clamp 40 against the action of spring 42 forwardly on platform 30. This downward pull on cable 49 against crank 47 also overcomes the upward biasing action of springs 32 on platform 30 to swing the platform downwardly about hinge 31 to the position as shown in phantom on FIGURE 2. In this relation of the parts, the poultry carcass may be conveniently placed on the support surface of platform 30 with the legs deposed between guides 34 and the poultry breast facing upwardly. On release of treadle 50, springs 32 raise platform 30 to the position shown in FIGURE 2 and at the same time spring 42 draws clamp 40 rearwardly to firmly urge the carcass legs into pockets 33 for proper positioning of the carcass.

Reference may now be made to the manner in which the head 21 is operated to draw it downwardly in opposition to springs 24. A suitable cable 55 is connected to the underside of head 21 by means of eye 56, with such cable extending down to a connection with a foot engageable treadle 57. The treadle is hingedly mounted at 51 in conjunction with the hinge mounting of treadle 50.

By engaging the treadle 57 and pressing it downwardly the cable 55 draws the head 21 down to insert the respective needles 22 carried by the head into the proper portions of the body of meat such as a poultry carcass. It may be noted that the relationship of the needles 22 as carried by head 21 is such that the two laterally outer most needles are inserted in the upwardly facing portion of the legs of the carcass. The two forward spaced needles are inserted respectively at the base of the wings while the remaining three pairs of needles are inserted three on each side of the breast of the poultry carcass.

In order to achieve full and even treatment of the meat distributed on a poultry carcass, injecting treating liquid into the opposite thighs of the carcass where fairly large masses of meat are disposed is desirable. Such side treating may also be desirable in other irregularly shaped bodies of meat. For such side treating there are provided a pair of elements 60 mounted on the cross-member 11 of frame 10. The mounting of these elements is provided by spaced pivots 61 providing parallel vertical axes with the elements 60 being respectively swingable above the axes. As shown more clearly in FIGURE 3, the axis for each member 60 is disposed intermediate the end of the element so that each element has a forward end 62 and a rearward actuating end 63.

The elements are thus mounted laterally on each side of the support surface of platform 30. A hollow liquid injecting needle 65, similar in construction to the needles 22 described hereinabove, is mounted on the forward end 62 of each element 60. As in the case of needles 22, each needle 65 has an adjustable collar 66 and a spring 68 disposed between the collar and the end 62 to yieldably urge the needle inwardly relative to end 62 while permitting the needle to yieldably slide relative to end 62 when it has been inserted to the limit of collar 66. A spring 70 is connected between the rear ends 63 of the elements 60 to urge the elements to a normal position where they are retracted in relation to the body of meat as shown on FIGURE 3.

A cam actuator 75 is mounted on head 21, such actuator having a downwardly tapering lower end 76 as shown in FIGURE 4. This tapering lower end 76 passes between the rear ends 63 of elements 60 and in the retracted or upper position of head 21 is disposed so that the elements 60 are retracted in the positions shown in FIGURE 3.

Upon actuation of treadle 57 to draw down the head 21 and thereby insert the needles 22 carried thereby into the poultry carcass, the cam actuator 75 is moved downwardly to engage with the rear ends 63 to cause elements 60 to swing about the pivots 61 and thereby move the forward ends 62 inwardly over the support surface of platform 30. It will be appreciated that with a body of meat such as a poultry carcass properly positioned and clamped on platform 30 the inward swinging movements of elements 60 will result in the needle 65 on each end 62 being inserted into one of the thighs of the carcass. Thus, by the single operation of depressing treadle 57 all of the needles 22 and 65 will be operated and inserted into appropriate locations on the poultry carcass clamped on platform 30.

To supply treating liquid to the needles 22 and 65, a suitable hose 80 is connected between each needle and the barrel 81 of a reciprocating piston pump 82. The pump 82 is connected by conduit 83 to a tank 85 which tank holds a quantity of the liquid such as a solution of monosodium glutamate and gelatin to be used in treating the body of meat.

The construction of the pump 82 and its relation to the solution tank 85 is shown in FIGURE 6. A check valve 86 is disposed in conduit 83 to form the intake valve for pump 82 while a suitable check valve 87 may be provided in each outlet from barrel 81 to a hose 80 to act as the outlet valve. Thus the pump can be effective in supplying treating liquid under pressure to the hollow needles through hoses 80.

In pump 82 a piston 90 is slidably received in barrel 81 and connected through a rod 91 to be actuated by a hand lever 92 which is pivotally mounted at 93 on frame 10. An adjustable collar 94 is provided on rod 91 to be engaged in operating the pump when lever 92 is manually drawn downwardly. To limit the stroke of piston 90 and thereby determine the quantity or volume of liquid injected into the body of meat, there is provided an adjustable collar 95 which may be set as desired longitudinally of rod 91. A spring 96 is provided beneath piston 90 to retract the piston when hand lever 92 is released.

The over-all operation of the apparatus should be apparent from the description of the specific structure given hereinabove. However the manipulative steps carried out in applying treating liquid to a body of meat such as a poultry carcass may be set forth by way of summary. Treadle 50 is initially pressed to open clamp 40 and lower platform 30 to the loading position. The body of meat such as a poultry carcass is placed on platform 30 in the position shown on FIGURE 1 and treadle 50 is released. Thereupon the platform moves upwardly to its treating position and clamp 40 moves rearwardly to force the carcass back into the proper treating location on platform 30.

Treadle 57 is then operated to move head 21 downwardly and insert needles 22. As has been described this downward movement of head 21 also actuates levers 60 to swing needles 65 inwardly so that all the needles are properly inserted into the carcass. In this position the hand lever 92 is operated through one stroke to pump a predetermined quantity of liquid through hoses 80 and the respective needles 22 and 65 thereby injecting the liquid into the body of meat.

Thereafter, lever 92 is released such that piston 90 moves upwardly under the urging of spring 96, thereby drawing in through check valve 84 a new quantity of liquid from tank 85. Treadle 57 is also released, whereupon springs 24 retract head 21 and spring 70 retracts the elements 60 so that all of the needles are withdrawn from the carcass. Then treadle 50 is depressed drawing the clamp 40 to open position and drawing down platform 30 so that the poultry carcass may be readily removed from the platform and an untreated poultry carcass loaded thereon for the next treating operation.

Many variations and modifications of the present invention will occur to those skilled in the art from a study of the invention modification specifically disclosed herein. All such variations and modifications which come within the spirit and scope of the appended claims are intended to be included herein as fully and completely as if they had been specifically illustrated, described and claimed. Thus the modification specifically disclosed in exemplary only and not intended to be limiting on the scope of the invention.

I claim:

1. Apparatus for injecting treating liquid into a body of meat such as a poultry carcass comprising a platform support for the meat to be treated, a first plurality of hollow liquid injecting needles mounted above and directed toward said support to be movable downwardly toward said support and be inserted into a body of meat on said support, a second plurality of hollow liquid injecting needles mounted above said support to be movable laterally inwardly above the meat supporting surface of said platform support and be inserted generally into the sides of a body of meat on such meat supporting surface, means for supplying treating liquid to each of said needles, and means connected to move said first plurality of needles downwardly toward said support and said second plurality of needles inwardly above the meat supporting surface of said platform support.

2. Apparatus for injecting treating liquid into a body of meat such as a poultry carcass comprising a frame carrying a platform having a support surface for the body of meat to be treated, an upstanding guide means on said frame, a head slidably mounted on said guide means and carrying a plurality of downwardly directed hollow liquid injecting needles overlying said support surface, an element swingably mounted laterally of each side of said support surface, a hollow needle mounted on each element to be movable inwardly above said support surface, means for supplying treating liquid to each of said needles, and means for moving said head downwardly and swinging said elements to insert said needles into a body of meat positioned on said support surface.

3. Apparatus for injecting treating liquid into a body of meat such as a poultry carcass comprising a frame carrying a platform having a support surface for the body of meat to be treated, clamp means yieldably mounted relative to said support surface to be movable from an open position to receive the body of meat to a clamping position whereat the body of meat is clamped in predetermined position on said support surface, upstanding guide means on said frame, a head slidably mounted on said guide means and carrying a plurality of downwardly directed hollow liquid injecting needles overlying said support surface, an element swingably mounted laterally of each side of said support surface, a hollow needle mounted on each element to be movable inwardly above said support surface, means for supplying treating liquid to each of said needles, and means for moving said head downwardly and swinging said elements to insert said needles into a body of meat clamped on said support surface.

4. Apparatus for injecting treating liquid into a body of meat such as a poultry carcass comprising a frame carrying a platform having a support surface for the body of meat to be treated, said platform being hingedly mounted at its rear end and biased to be swingable from a downwardly inclined loading position upwardly to a meat treating position, a clamp slidably mounted adjacent the forward end of said platform and biased rearwardly from an open position to receive the body of meat to a clamping position whereat the body of meat is clamped in predetermined position on said support surface, means for operating said clamp to said open position and swinging said platform to said loading position, a plurality of hollow liquid injecting needles mounted to be insertable into a body of meat clamped on said support surface, means for inserting said needles into a body of meat on said support surface, and means for supplying treating liquid to each of said needles for injection into the body of meat when the needles are inserted thereinto.

5. Apparatus for injecting treating liquid into a poultry carcass comprising a frame carrying a platform having a support surface for the body of meat to be treated, positioning elements mounted relative to said support surface to engage with and properly locate the poultry carcass on said support surface, clamp means yieldably mounted relative to said support surface to be movable from an open position to receive the carcass to a clamping position whereat the carcass is clamped in conjunction with said positioning elements in predetermined position on said support surface, upstanding guide means on said frame, a head slidably mounted on said guide means and carrying a plurality of downwardly directed hollow liquid injecting needles overlying said support surface, an element swingably mounted laterally of each side of said support surface, a hollow needle mounted on each element to be movable inwardly above said support surface, means for supplying treating liquid to each of said needles, and means for moving said head downwardly and swinging said elements to insert said needles into a body of meat clamped on said support surface.

6. Apparatus for injecting treating liquid into a body of meat such as a poultry carcass comprising a frame carrying a platform having a support surface for the body of meat to be treated, upstanding guide means on said frame, a head slidably mounted on said guide means and carrying a plurality of downwardly directed hollow liquid injecting needles overlying said support surface, each of said needles being yieldably mounted on said head and having a stop collar adjustably secured thereon to limit the degree of insertion of the needle into the body of meat with means biasing the needle downwardly relative to said head, an element swingably mounted laterally of each side of said support surface, a hollow needle mounted on each element to be movable inwardly above said support surface, means for supplying treating liquid to each of said needles, and means for moving said head downwardly and swinging said elements to insert said needles into a body of meat positioned on said support surface.

7. Apparatus for injecting treating liquid into a body of meat such as a poultry carcass comprising a platform for supporting the meat to be treated, said platform being hingedly mounted at one end thereof to swing from a downwardly inclined loading position upwardly to a meat treating position, a clamp for the body of meat to be treated mounted on said platform and movable from an open position to receive the body of meat to a clamping position whereat the body of meat is clamped on said platform for treatment, mounting means overlying said platform and carrying a plurality of liquid injecting hollow needles directed downwardly toward said platform, said mounting means being movable downwardly to carry said needles down into meat supported on said platform, an element swingably mounted at each of the opposite sides of said platform with each element carrying a hollow needle directed inwardly above the meat treating position of said platform, means for swinging said elements inwardly to insert the needles carried thereby into the generally opposite sides of the meat on said platform, conduit means connected to said needles for conveying treating liquid to each of said needles, and pump means for supplying treating liquid to said conduit means.

8. Apparatus for injecting treating liquid into a body of meat such as a poultry carcass comprising a frame carrying a platform having a support surface for the body of meat to be treated, upstanding guide means on said frame, a head slidably mounted on said guide means and carrying a plurality of downwardly directed hollow liquid injecting needles overlying said support surface, an element swingably mounted laterally of each side of said support surface, a hollow needle mounted on each element to be movable inwardly above said support surface, conduit means connecting said needles for supplying treating liquid thereto, reciprocable piston pump means mounted on said frame and communicating with said conduit means for supplying treating liquid, said pump means having an operating handle manually operable to supply a predetermined quantity of treating liquid to said needles, means associated with said pump means and said handle to adjustably limit the stroke of said pump means in determining the quantity of treating liquid supplied by one operation of said handle, and means for moving said head downwardly and swinging said elements to insert said needles into a body of meat positioned on said support surface.

9. Apparatus for injecting treating liquid into a body of meat such as a poultry carcass comprising a frame carrying a platform having a support surface for the body of meat to be treated, upstanding guide means on said frame, a head slidably mounted on said guide means and carrying a plurality of downwardly directed hollow liquid injecting needles overlying said support surface, an element mounted laterally of each side of said support surface to be swingable about a generally vertical axis disposed intermediate the ends of said element, a hollow needle mounted on the forward end of each element to be movable inwardly above said support surface, cam means mounted to be movable with said head and disposed to engage between the rearward ends of said elements to cause the forward needle carrying ends of said elements to move inwardly upon downward movement of said head, means for moving said head downwardly to effect insertion of said needles into a body of meat positioned on said support surface, and means for supplying treating liquid to each of said needles.

10. Apparatus as recited in claim 9 wherein said means for moving said head includes a foot engageable treadle connected to move said head downwardly.

11. Apparatus for injecting treating liquid into a body of meat such as a poultry carcass comprising a frame carrying a platform having a support surface for the body of meat to be treated, said platform being hingedly mounted at its rear end and biased to be swingable from a downwardly inclined loading position upwardly to a meat treating position, a clamp slidably mounted adjacent the forward end of said platform and biased rearwardly from an open position to receive the body of meat to a clamping position whereat the body of meat is clamped in predetermined position on said support surface, a foot engageable treadle connected to said clamp to operate said clamp to said open position and swing said platform to said loading position, a plurality of hollow liquid injecting needles mounted to be insertable into a body of meat clamped on said support surface, means for inserting said needles into a body of meat on said support surface, and means for supplying treating liquid to each of said needles for injection into the body of meat when the needles are inserted thereinto.

12. Apparatus for injecting treating liquid into a body of meat such as a poultry carcass comprising a frame carrying a platform having a support surface for the body of meat to be treated, said platform being hingedly mounted at its rear end and biased to be swingable from a downwardly inclined loading position upwardly to a meat treating position, clamp means yieldably mounted relative to said support surface to be movable from an open position to receive the body of meat to a clamping position whereat the body of meat is clamped in predetermined position on said support surface, a foot engageable treadle connected to said clamp means to operate said clamp means to said open position and swing said platform to said loading position, upstanding guide means on said frame, a head slidably mounted on said guide means and carrying a plurality of downwardly directed hollow liquid injecting needles overlying said support surface, an element swingably mounted laterally of each side of said support surface, a hollow needle mounted on each element to be movable inwardly above said support surface, means for supplying treating liquid to each of said needles, and means for moving said head downwardly and swinging said elements to insert said needles into a body of meat positioned on said support surface.

13. Apparatus for injecting treating liquid into a body of meat such as a poultry carcass comprising a frame carrying a platform having a support surface for the body of meat to be treated, said platform being hinged mounted at its rear end and biased to be swingable from a downwardly inclined loading position upwardly to a meat treating position, clamp means yieldably mounted relative to said support surface to be movable from an open position to receive the body of meat to a clamping position whereat the body of meat is clamped in predetermined position on said support surface, means for operating said clamp means to said open position and swinging said platform to said loading position, upstanding guide means on said frame, a head slidably mounted on said guide means and carrying a plurality of downwardly directed hollow liquid injecting needles overlying said support surface, an element mounted laterally of each side of said support surface to be swingable about a generally vertical axis disposed intermediate the ends of said element, a hollow needle mounted on the forward end of each element to be movable inwardly above said support surface, cam means mounted to be movable with said head and disposed to engage between the rearward ends of said elements to cause the forward needle carrying ends of said elements to move inwardly upon downward movement of said head, means for moving said head downwardly to effect insertion of said needles into a body of meat positioned on said support surface, and means for supplying treating liquid to each of said needles.

14. Apparatus as recited in claim 13 wherein said means for operating said clamp means and said means for moving said head include separate foot engagable treadles.

15. Apparatus as recited in claim 14 wherein said means for supplying treating liquid includes a piston pump means having an operating handle manually operable to supply a predetermined quantity of treating liquid to said needles.

References Cited in the file of this patent

UNITED STATES PATENTS

| 742,576 | Bronaugh | Oct. 27, 1903 |
| 1,977,202 | Palkowski | Oct. 16, 1934 |
| 2,101,396 | Kingsbury | Dec. 7, 1937 |
| 2,560,060 | Zevosta | July 10, 1951 |